Sept. 16, 1969   W. P. BURBRIDGE ET AL   3,467,104
METHOD AND APPARATUS FOR DENTAL ANESTHETIZATION
Filed Oct. 31, 1966   2 Sheets-Sheet 1

William P. Burbridge
John R. Morgan
Thomas S. Schmitt
INVENTORS

BY Arnold and
Roylance
ATTORNEYS

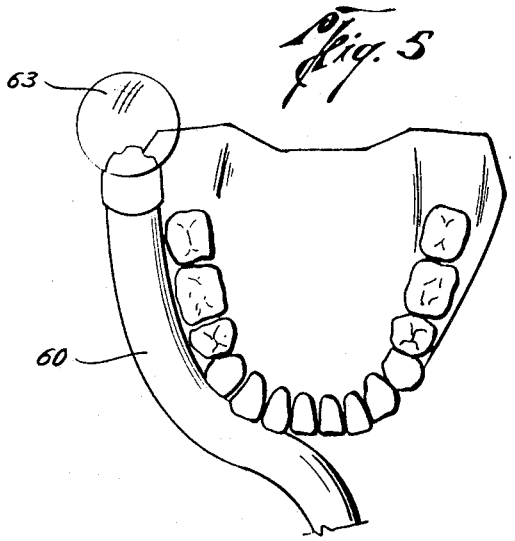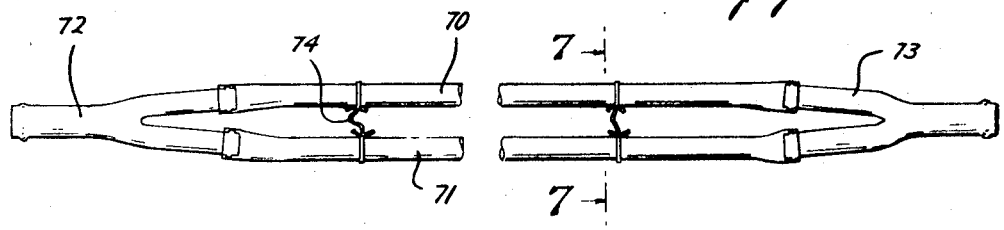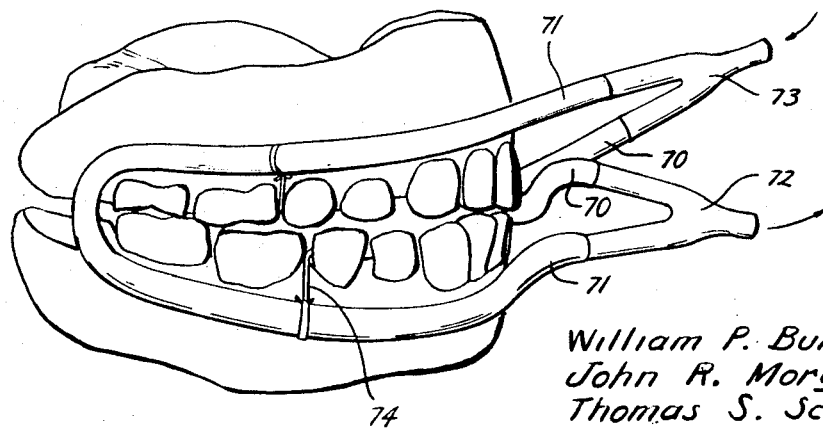

United States Patent Office 3,467,104
Patented Sept. 16, 1969

3,467,104
METHOD AND APPARATUS FOR DENTAL ANESTHETIZATION
William P. Burbridge, Houston, and John R. Morgan and Thomas S. Schmitt, Victoria, Tex., assignors to Surgical Eng. and Research Corp., Victoria, Tex., a corporation of Texas
Filed Oct. 31, 1966, Ser. No. 590,978
Int. Cl. A61f 7/12
U.S. Cl. 128—400                                            23 Claims

ABSTRACT OF THE DISCLOSURE

Dental anesthetization is effected by cooling nerves associated with teeth at a relatively rapid rate in order to minimize ischemia around the nerves before cooling thereof.

An applicator is provided for effecting the anesthetization comprising a duct shaped to fit inside the mouth against the gingival surface of a row of teeth.

---

The invention concerns methods and apparatus suitable for anesthetizing teeth and adjacent tissues by the application of cold.

Dental anesthetization to be practical must effect anesthesia rapidly, must do so with a minimum of pain, and must not harm the teeth or gingival tissues. Conventionally, local injections have been employed to effect anesthesia, even though many patients are anxious about injections, and injections ordinarily require a wait of several minutes before anesthesia is effected.

The invention provides methods and apparatus for dental anesthetization which can effect anesthesia rapidly, and which can reduce anxiety otherwise manifested by many patients. Apparatus and methods in accordance with the invention can be employed to induce anesthesia on routine fillings, periodontal curettage, gingivectomies, and tissue biopsies, as well as to control hemorrhage associated with extractions. Methods and apparatus in accordance with the invention may also be employed during crown and bridge restorations, extractions, and work on root canals.

In one embodiment of the invention, a dental applicator is provided which is particularly useful in apparatus for anesthetizing teeth and adjacent tissues by the application of cold. The dental applicator comprises a duct shaped to fit inside the mouth and against both buccal and lingual gingival surfaces associated with a row of teeth in heat-transferring relationship for a distance of at least four teeth, with the applicator being sufficiently flexible to be comformable to both the buccal and lingual gingival surfaces for at least this distance. Consequently, the dental applicator is capable of effecting sufficient heat transfer between the applicator and the gingival surfaces for dental anesthetization. The applicator is constructed such that it is sufficiently rigid at anesthetization temperatures to retain its shape and remain conformed to the gingival surfaces in heat-transferring relationship after being conformed thereto. The applicator may be made of a material which is flexible at ordinary mouth temperatures but which becomes rigid upon the application of cold. Alternatively, the applicator may include a suitable metal or other material which retains its shape after being conformed to the gingival surfaces. A combination of a metal support within a flexible tube such that the metal support will cause the tube to remain in a conformed shape after being bent to the desired position is a preferred embodiment.

Preferably, the applicator includes a duct for conducting cold fluid sufficiently close to at least one of the buccal and lingual surfaces to provide sufficient heat transfer for dental anesthetization. The dental applicator is also preferably constructed such that it is sufficiently long to anesthetize at least one quadrant of teeth while at the same time it is entering the mouth near the cuspids distal from that quadrant.

The applicator may be employed by laying at least one flexible heat-transferring surface thereof against the buccal and lingual gingival surfaces associated with a row of teeth for a distance of at least four teeth, conforming the heat-transferring surface to the gingival surfaces, and cooling the heat-transferring surface to a temperature sufficient for dental anesthetization while the heat-transferring surface remains conformed to the ginival surfaces for a distance of at least four teeth. The flexible heat-transferring surface is preferably a part of a tubular conduit, and the cooling is preferably effected by associating with the interior of the conduit a fluid at a sufficiently cold temperature.

To be practical, the dental applicator must anesthetize at least four teeth, preferably at least one quadrant of teeth, in one application. Otherwise, the technique requires too much time for general dentistry.

The heat-transferring surface applied to the gingival surfaces is preferably cooled to a temperature below 0° C. sufficient for dental anesthetization at a rate sufficient to minimize ischemia in the gingival tissues before cooling of the nerves located therein. Rapid cooling in this manner minimizes pain and discomfort of the patient. The surface is preferably cooled from ambient temperature to less than 0° C. in less than about 20 seconds to achieve this purpose. Temperatures of less than 0° C. down to −7°C. have been found effective, although the exact preferred low temperature of course varies slightly depending on the patient. Temperatures less than 0° C. down to about −10° C. and lower may be within the operative range without harm to the tissues.

In addition, to minimize pain and discomfort of a patient the heat-transferring surface applied to the gingival surfaces is preferably made of a material other than metal, although metal may be employed in the applicator as long as it does not directly contact the gingival surfaces. One should also avoid contacting the teeth with the dental applicator when the applicator is cold in order to minimize pain and discomfort of the patient.

Refrigeration apparatus preferred for use with a dental applicator in accordance with the invention, as well as other embodiments of the dental applicator, are described below. The refrigeration apparatus, of course, preferably has sufficient capacity to cool the dental applicator to a temperature less than 0° C. in less than about 20 seconds.

In the drawings:

FIG. 5 is a schematic view of the dental applicator shown in FIG. 4 in anesthetizing position in relation to a quadrant of teeth;

FIG. 6 is a plan view of another embodiment of a dental applicator in accordance with the invention;

FIG. 7 is a sectional view taken along the line 7—7 in FIG. 6; and

FIG. 8 is a schematic view of the dental applicator shown in FIG. 6 in anesthetizing position in relation to upper and lower quadrants of the mouth.

Figure 1:
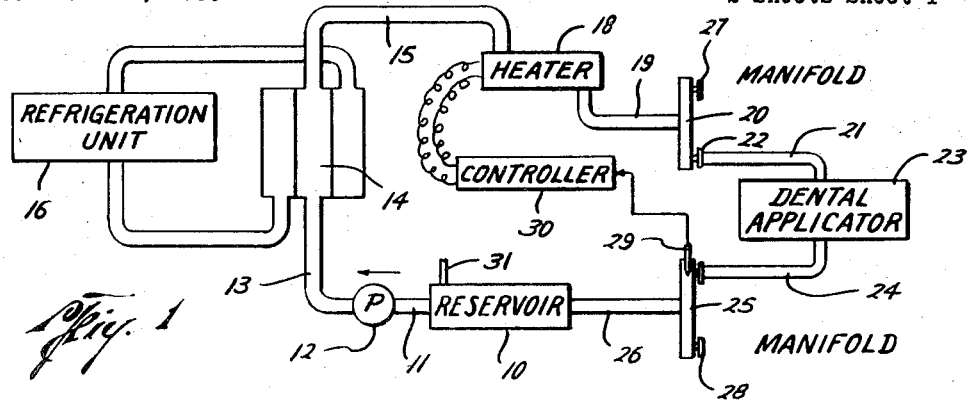
FIG. 1 is a schematic view of apparatus in accordance with the invention suitable for anesthetizing teeth.

Apparatus suitable for anesthetizing teeth is shown schematically in FIG. 1. As there shown, the reservoir 10 is connected to a pump 12 by a conduit 11, the pump 12 pumping fluid from the reservoir 10 through a conduit 13 to a heat exchanger 14. The heat exchanger 14 is associated with a refrigeration unit 16 to form a means for cooling fluid in the system. Cooled fluid travels from the heat exchanger 14 through a conduit 15 to a heater 18, and on to a manifold 20 through a conduit 19. A conduit 21 is connected to the manifold 20 through a suitable coupling 22, conduit 21 communicating with a dental applicator 23. Another conduit 24 communicates with the dental applicator 23 for returning fluid from the dental applicator 23 to a second manifold 25, which communicates by conduit 26 with reservoir 10, to form a continuous passageway for recirculation of the fluid. Manifolds 20 and 25 of course may be omitted from the system, or they may include other couplings, such as couplings 27 and 28, to permit more than one dental applicator to be connected to the refrigeration system. A fill tube 31 may for convenience be associated with the reservoir 10.

A temperature indicating device 29 is located in the manifold 25 to indicate the temperature of the fluid in the dental applicator 23, although the device could be located in the manifold 20, or other suitable location near the dental applicator, if desired. The temperature indicating device 29 may be, for example, a thermocouple, a thermistor, or the like. The temperature indication of the device 29 is connected with a controller 30 which controls the energy input to the heater 18 in response to the temperature indication. The heater 18 in turn controls the temperature of the fluid entering the dental applicator 23. The controller 30 can be conventional equipment; the heater 18 may include a conventional electrical resistance heater around which the fluid from conduit 15 flows to conduit 19, although any suitable heating means can suffice.

It has been found that the use of a heater to control the temperature of the fluid in the anesthetization system permits excellent control of the temperature of the fluid entering the dental applicator, and permits the system to effect a very rapid temperature decrease in the dental applicator to achieve dental anesthetization with a minimum of pain and discomfort of the patient. The fluid is preferably water with a suitable freezing point depressant, such as sodium chloride or ethylene glycol, although many many other fluids may be used satisfactorily.

Figure 2:
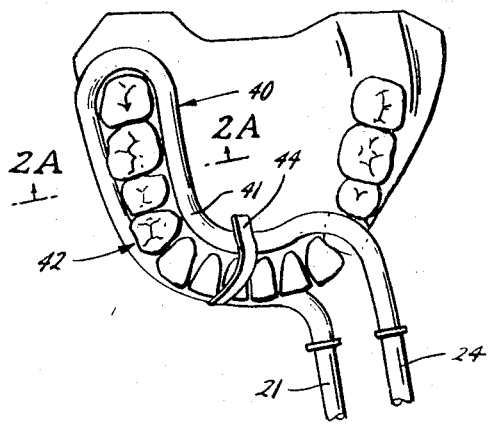
FIGURE 2 is a schematic view of a dental applicator in accordance with the invention in anesthetizing position on a quadrant of teeth.
Figure 2A:
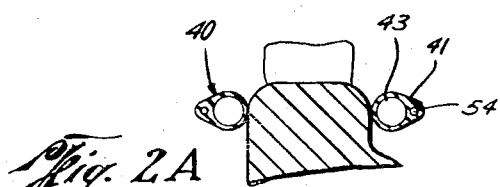
FIG. 2A is a sectional view taken along the line 2A—2A in FIG. 2.

With reference to FIGS. 2 and 2A, a dental applicator 40 is shown in place along the buccal and lingual gingival surfaces of a quadrant of teeth 42. The applicator 40 comprises a tubular conduit 41 with a duct 43 therein for fluid flow, the conduit 41 being in the shape of an elongated U with one leg shaped to fit against the buccal gingival surface in the quadrant, the other leg shaped to fit against the lingual gingival surface in the quadrant, and the base of the U forming a cross-over between the buccal gingival surface and the lingual gingival surface back of the most posterior tooth in the quadrant. The applicator 40 is also shaped such that the ends of the legs depart from the mouth on the side of the mouth opposite the gingival surfaces to be cooled, approximately near the cuspids distal from the quadrant being anesthetized. The ends of the legs of the dental applicator 40 may be connected in any suitable manner to two conduits 21 and 24 to effect fluid communication between the duct 43 and the conduits 21 and 24, which conduits 21 and 24 communicate with the refrigeration system as shown in FIG. 1.

Figure 3:
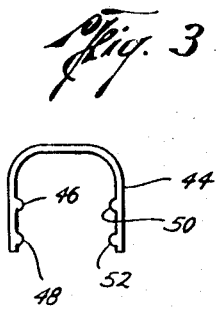
FIG. 3 is a plan view of a dental clamp shown in FIG. 2.

A dental clamp 44, which is shown in plan view in FIG. 3, may be disposed to help hold the dental applicator 40 in proper conformity with the buccal and lingual gingival surfaces. As shown in FIG. 3, the clamp 44, which may be made of any suitable elastic material such as a metal or a combination of metal and other materials, may conveniently include a pair of ridges 46 and 48 on one leg thereof and a pair of ridges 50 and 52 on the other leg thereof to help hold the conduit 41 of the dental applicator 40 in proper position.

The dental applicator 40 may be a tubular conduit made of plastic, such as polyvinyl chloride or latex tubing, which at approximately 0° C. is sufficiently rigid to maintain its shape during dental anesthetization. Alternatively, the dental applicator 40 may comprise a sufficiently flexible aluminum tube coated with a suitable plastic or latex material to avoid contact of metal with the gingival surfaces.

A preferred construction of the dental applicator 40 is better shown in FIG. 2A. As there shown, the tubular conduit 41 has embedded therein a strip of metal 54 which helps maintain the tubular conduit 41 in any shape to which the tubular conduit 41 is bent. This construction may be made by coating a layer of pure gum natural rubber over an elongated U-shaped stainless steel support, and then curing the layer of rubber for approximately 50% of the normal curing time. A partially cured natural rubber tubular conduit, having for example an outside diameter of 1/8 to 1/4 inch, also is prepared in a suitable manner, such as by coating a layer of rubber over a flexible rubber mandrel having a release agent thereon, curing this layer for approximately 50% of normal curing time, and then removing the partially cured tubular product from the mandrel. The partially cured tubular product is then placed against the inner surface of the rubber-covered U-shaped metal support, and the resultant structure is then coated with a layer of pure gum natural rubber. The resultant structure is then completely cured to finish preparation of the dental applicator. The rubber conduit of this applicator acts like a ballon upon introduction therein of fluid under pressure to ensure good heat-transferring contact between the applicator and the gingival surfaces.

As shown in FIG. 2A, the applicator should fit against the gingival surfaces but not against the teeth. The buccal portion of the applicator should fit in the buccal gutter. Suitable temperature insulating pads may be employed if necessary to avoid contacting the teeth directly with the applicator, particularly at locations where the applicator crosses a row of teeth.

Figure 4:
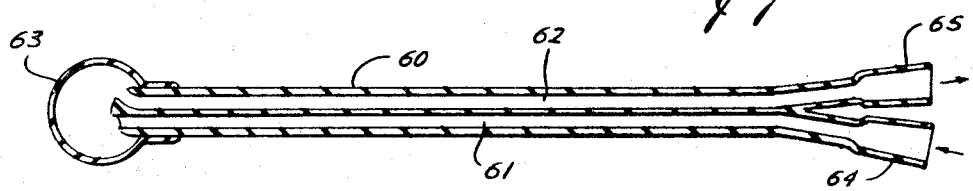
FIG. 4 is a sectional view of another embodiment of a dental applicator in accordance with the invention.

Another embodiment of a dental applicator in accordance with the invention is shown in FIG. 4. As there shown, the applicator comprises a support structure 60 having an inlet duct 61 and an outlet duct 62 therein, and having an expansible balloon-shaped structure 63 heat-vulcanized to one end thereof in fluid communication with both the inlet duct 61 and outlet duct 62. At the opposite end of the support structure 60 are suitable connectors 64 and 65 to permit connection with fluid conduits, such as conduit 21 and 24 in FIG. 1. The balloon structure 63 may be made of gum rubber sheeting, or the like, and the support structure 60 may be made of red pure gum rubber, natural gum rubber, plastic, or the like. In use, this applicator is disposed against tissues near the trigeminal nerve located near the jaw hinge, as shown schematically in FIG. 5. After location of the applicator adjacent this nerve, cold fluid entering the inlet duct 61 will cause the balloon structure 63 to expand into heat-transferring relationship with the tissues adjacent this nerve to achieve dental anesthetization of the associated lower quadrant of the mouth by cooling this nerve. The dental applicator of course should be disposed in the mouth such that direct contact with teeth is avoided. This approach, of course, can be combined with the concept of direct cooling of gingival surfaces in a single applicator.

Another embodiment of a dental applicator in accordance with the invention is shown in FIGS. 6, 7 and 8. The applicator comprises a plastic tube 70 disposed in parallel relationship with another plastic tube 71. A Y-shaped connector 72 is connected with the two tubes 70 and 71 at one end thereof and a second Y-shaped connector 73 is connected to the other end of the two tubes 70 and 71.

The connectors 72 and 73 are shaped to accept connection with conduits 21 and 24 in FIG. 1. Suitable supports 74 may be employed between the tubes 70 and 71 if desired.

As illustrated in FIG. 8, the dental applicator shown in FIG. 6 can be located in the mouth in heat-transferring relationship with the buccal and lingual gingival surfaces of both upper and lower quadrants of teeth to effect dental anesthetization of both quadrants at the same time. In this position, the individual tubes 70 and 71 are located in heat-transferring relationship with the buccal and lingual gingival surfaces, respectively, of the upper and lower quadrants of teeth of one-half of the mouth. Thus anesthetization of one-half of the mouth can be effected upon introduction of cold fluid into the applicator. Suitable clamps of course may be employed to hold the tubes 70 and 71 in the desired position.

The above description and the drawings are illustrative of the invention, and should not be construed to limit the scope of the invention unnecessarily.

Another advantage of dental anesthetization in accordance with the invention, in contrast to injection techniques, is that the anesthesia effected can be rapidly removed by allowing the gingival surfaces to warm naturally, or by inducing faster removal of anesthesia by supplying sufficient heat to the system, such as with the electrical resistance heater, to warm the dental applicator. Of course, the anesthetization apparatus could be constructed if desired to permit use of the heat output of the refrigeration unit to warm the dental applicator.

What is claimed is:

1. Apparatus suitable for anesthetizing teeth, said apparatus comprising a fluid conduit containing a fluid; cooling means associated with said conduit for cooling said fluid to a temperature sufficient for dental anesthetization; means associated with said conduit for causing said fluid to flow through said conduit; means for measuring the temperature of said fluid in said conduit; heating means associated with said conduit to permit control of the temperature of said fluid; and a dental applicator communicating with said conduit to accept fluid therefrom, said applicator being shaped to fit inside the mouth and against both buccal and lingual gingival surfaces associated with a row of teeth in heat-transferring relationship for a distance of at least four teeth, said applicator being sufficiently flexible to be conformable to both said buccal and lingual gingival surfaces for at least said distance, thereby to permit sufficient heat transfer between said applicator and said gingival surfaces for dental anesthetization, said applicator being sufficiently rigid at anesthetization temperatures to retain its shape and remain conformed to said gingival surfaces in heat-transferring relationship after being conformed thereto.

2. The apparatus defined in claim 1, wherein said applicator includes at least one duct which communicates with said conduit and which conducts fluid sufficiently close to at least one of said buccal and lingual gingival surfaces to provide sufficient heat transfer for dental anesthetization.

3. The apparatus defined in claim 2, wherein said applicator is sufficiently long to anesthetize at least one quadrant of teeth and is shaped to enter the mouth near the cuspids distal from said quadrant.

4. The apparatus defined in claim 1, wherein said applicator comprises a duct shaped in the form of an elongated U with one leg shaped to fit against the buccal gingival surface, the other leg shaped to fit against the lingual gingival surface, the base forming a crossover between the buccal gingival surface and the lingual gingival surface, and the ends of the legs being shaped to depart from the mouth.

5. The apparatus defined in claim 4, wherein said duct is made of plastic or latex tubing.

6. The apparatus defined in claim 4, wherein said applicator is sufficiently long to fit against said gingival surfaces from near the most posterior portion of said gingival surfaces to a position near the most anterior portion of said surfaces, the ends of the legs departing from the mouth on the side of the mouth opposite said gingival surfaces.

7. The apparatus defined in claim 1, wherein said heating means is automatically responsive to said means for measuring the temperature of said fluid.

8. The apparatus defined in claim 4, wherein said conduit and said applicator form a continuous passageway for recirculation of said fluid.

9. The apparatus defined in claim 1, wherein said applicator and said conduit form a continuous passageway for recirculation of said fluid; said applicator comprises a duct shaped in the form of an elongated U with one leg shaped to fit against the buccal gingival surface, the other leg shaped to fit against the lingual gingival surface, the base forming a crossover between the buccal gingival surface and the lingual gingival surface, and the ends of the legs being shaped to depart from the mouth; and said heating means is automatically responsive to said means for measuring temperature of said fluid.

10. In apparatus for anesthetizing teeth and adjacent tissues by the application of cold; a dental applicator comprising a duct shaped to fit inside the mouth and against both buccal and lingual gingival surfaces of gingival tissue associated with a row of teeth in heat-transferring relationship for a distance of at least four teeth, said applicator being sufficiently flexible to be comformable to both said buccal and lingual gingival surfaces for at least said distance, thereby to permit sufficient heat transfer between said applicator and said gingival surfaces for dental anesthetization, said applicator being sufficiently rigid at anesthetization temperatures to retain its shape and remain conformed to said gingival surfaces in heat-transferring relationship after being conformed thereto; and means for cooling said applicator to a temperature below 0° C. sufficient for dental anesthetization at a rate sufficient to minimize ischemia in said tissue before cooling of the nerves therein.

11. The apparatus defined in claim 10, wherein said applicator includes at least one duct for conducting cold fluid sufficiently close to at least one of said buccal and lingual gingival surfaces to provide sufficient heat transfer for dental anesthetization; and said means for cooling has cooling capacity sufficient to cool said applicator in heat-transferring relationship with said surfaces from ambient temperature to less than 0° C. in less than about 20 seconds.

12. The apparatus defined in claim 11, wherein said applicator is sufficiently long to anesthetize at least one quadrant of teeth and is shaped to enter the mouth near the cuspids distal from said quadrant.

13. The apparatus defined in claim 10, wherein said applicator comprises a duct shaped in the form of an elongated U with one leg shaped to fit against the buccal gingival surface, the other leg shaped to fit against the lingual gingival surface, the base forming a crossover between the buccal gingival surface and the lingual gingival surface, and the ends of the legs being shaped to depart from the mouth.

14. The apparatus defined in claim 13, wherein said duct is made of plastic or latex tubing.

15. The apparatus defined in claim 13, wherein said applicator is sufficiently long to fit against said gingival surfaces from near the most posterior portion of said gingival surfaces to a position near the most anterior portion of said surfaces, the ends of the legs departing from the mouth on the side of the mouth opposite said gingival surfaces.

16. A method for anesthetizing teeth, which method comprises laying at least one flexible heat-transferring surface against the buccal and lingual gingival surfaces associated with a row of teeth for a distance of at least four teeth; conforming said heat-transferring surface to said gingival surfaces; cooling said heat-transferring surface to a temperature sufficient for dental anesthetization while said heat-transferring surface remains conformed to said gingival surfaces for a distance of at least four teeth; said heat-transferring surface being a part of at least one conduit, and said surface being cooled by associating with the interior of said conduit fluid at a temperature sufficient for dental anesthetization; and controlling the temperature of said fluid by both cooling and heating said fluid.

17. The method defined in claim 16, wherein said heat-transferring surface is laid against said gingival surfaces from a position at least near the most posterior tooth associated with said gingival surfaces to a position near the most anterior portion of said surfaces to effect anesthetization of at least one quadrant of teeth.

18. The method defined in claim 16, wherein after dental anesthetization said anesthetization is removed by controlled heating of said heat-transferring surface.

19. A method for anesthetizing teeth, which method comprises laying at least one heat-transferring surface in heat-transferring relationship against at least one surface of tissue having nerves therein associated with teeth; and cooling said heat-transferring surface to a temperature below 0° C. sufficient for dental anesthetization at a rate sufficient to minimize ischemia in said tissue before cooling of said nerves.

20. The method defined in claim 19, wherein said heat-transferring surface is cooled from ambient temperature to less than 0° C. in less than about 20 seconds.

21. The method defined in claim 19, wherein at least one heat-transferring surface is laid against both buccal and lingual gingival surfaces associated with a row of teeth for a distance of at least four teeth.

22. The method defined in claim 19, wherein at least one heat-transferring surface is laid against both buccal and lingual gingival surfaces associated with a row of teeth for a distance of at least four teeth; and wherein said heat-transferring surface is cooled from ambient temperature to less than 0° C. in less than about 20 seconds.

23. The method defined in claim 22, wherein at least one heat-transferring surface is laid against both buccal and lingual gingival surfaces associated with at least one quadrant of teeth, to effect anesthetization of said quadrant of teeth.

References Cited

UNITED STATES PATENTS

| | | | |
|---|---|---|---|
| 2,167,467 | 7/1939 | Sisson | 128—402 |
| 2,192,768 | 3/1940 | Cross | 128—401 |
| 2,429,238 | 10/1947 | Restarski et al. | 128—400 |

L. W. TRAPP, Primary Examiner

U.S. Cl. X.R.

128—401, 402